(12) United States Patent
Wang et al.

(10) Patent No.: US 6,507,895 B1
(45) Date of Patent: Jan. 14, 2003

(54) METHOD AND APPARATUS FOR ACCESS DEMARCATION

(75) Inventors: Hong Wang, Fremont, CA (US); Ralph Kling, Sunnyvale, CA (US); Jeff Baxter, Los Gatos, CA (US); Konrad Lai, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,665

(22) Filed: Mar. 30, 2000

(51) Int. Cl.$^7$ .............................................. G06F 12/02
(52) U.S. Cl. ...................... 711/137; 711/169; 711/213; 711/217; 711/140
(58) Field of Search ................................ 711/137, 169, 711/213, 217, 218, 119, 122, 120, 121, 140, 104, 105; 326/11; 345/534; 707/100

(56) References Cited

U.S. PATENT DOCUMENTS

| | | | |
|---|---|---|---|
| 5,442,747 A | * 8/1995 | Chan et al. | 345/534 |
| 5,822,790 A | * 10/1998 | Mehrotra | 326/11 |
| 5,829,025 A | * 10/1998 | Mittal | 711/122 |
| 5,941,981 A | * 8/1999 | Tran | 711/137 |
| 5,960,452 A | * 9/1999 | Chi | 707/100 |

OTHER PUBLICATIONS

Jouppi, "Improving Direct–Mapped Cache Performance by the Addition of a Small Fully–Associative Cace and Prefetch Buffers", © 1990, IEEE, p. 364–373/.*
Handy, ® 1998, Academic Press Limited, pp. 53–54.*

* cited by examiner

Primary Examiner—Matthew Kim
Assistant Examiner—B. R. Peugh
(74) Attorney, Agent, or Firm—Blakely, Sokoloff, Taylor & Zafman LLP (57) ABSTRACT

An embodiment of the present invention provides for an apparatus for memory access demarcation. Data is accessed from a first cache, which comprises a first set of addresses and corresponding data at each of the addresses in the first set. A plurality of addresses is generated for a second set of addresses. The second set of addresses follows the first set of addresses. The second set of addresses are calculated based on a fixed stride, where the second set of addresses are associated with data from a first stream. A plurality of addresses is generated for a third set of addresses. The third set of addresses follows the first set of addresses. Each address in the third set of addresses is generated by tracing a link associated with another address in the third set of addresses. The third set of addresses is associated with data from a second stream.

25 Claims, 6 Drawing Sheets

METHOD AND APPARATUS FOR ACCESS DEMARCATION

FIELD OF THE INVENTION

The present invention relates generally to field of memory access. More specifically, the present invention is directed to a method and an apparatus for improving the performance of memory access.

BACKGROUND

Cache is a special high-speed storage mechanism. Cache is usually made up of high-speed static random access memory (SRAM) instead of the slower and cheaper dynamic random access memory (DRAM) that is used for main memory. Caching is effective because most programs access the same data or instructions over and over. By keeping as much of this information as possible in the cache, the computer avoids delay caused by accessing the slower main memory. As such, cache performance is important because of its effect on the performance of the processors.

Traditionally, each cache has two sub-systems, a tag subsystem which holds the memory addresses and determines whether there is a match for a piece of information requested by the processor, and a memory subsystem which holds and delivers the data. A cache hit occurs when the piece of information that the processor requests is found in the cache. A cache miss occurs when the information is not in the cache.

One technique for improving the performance of the cache is to increase the cache size. Having a larger cache size helps increasing the possibility of a cache hit. However, this technique is expensive due to the high cost of SRAM. Furthermore, the larger cache size increases the cache access cycle time.

One disadvantage of the traditional cache system is that all memory accesses are treated the same even though the memory accesses may not be the same. It is a one-fit-all memory hierarchy. Accessing a single piece of data is treated the same as accessing each piece of data in an array of data. There is no ability to distinguish different workloads and there is no ability to provide a different treatment for each different workload.

SUMMARY OF THE INVENTION

An embodiment of the present invention provides for an apparatus for memory access demarcation. Data is accessed from a first cache, which comprises a first set of addresses and corresponding data at each of the addresses in the first set. A plurality of addresses is generated for a second set of addresses. The second set of addresses follows the first set of addresses. The second set of addresses is calculated based on a fixed stride, where the second set of addresses are associated with data from a first stream. A plurality of addresses is generated for a third set of addresses. The third set of addresses follows the first set of addresses. Each address in the third set of addresses is generated by tracing a link associated with another address in the third set of addresses. The third set of addresses is associated with data from a second stream.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

A method and an apparatus for memory access demarcation are disclosed. In the following description, for purposes of explanation, specific nomenclature is set forth to provide a thorough understanding of the present invention. However, it would be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processes leading to a desired result. The processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method processes. The required structure for a variety of these systems will appear from the description below. In addition, the present invention is not described with reference to any particular programming language. It will be appreciated that a variety of programming languages may be used to implement the teachings of the invention as described herein.

Figure 1:
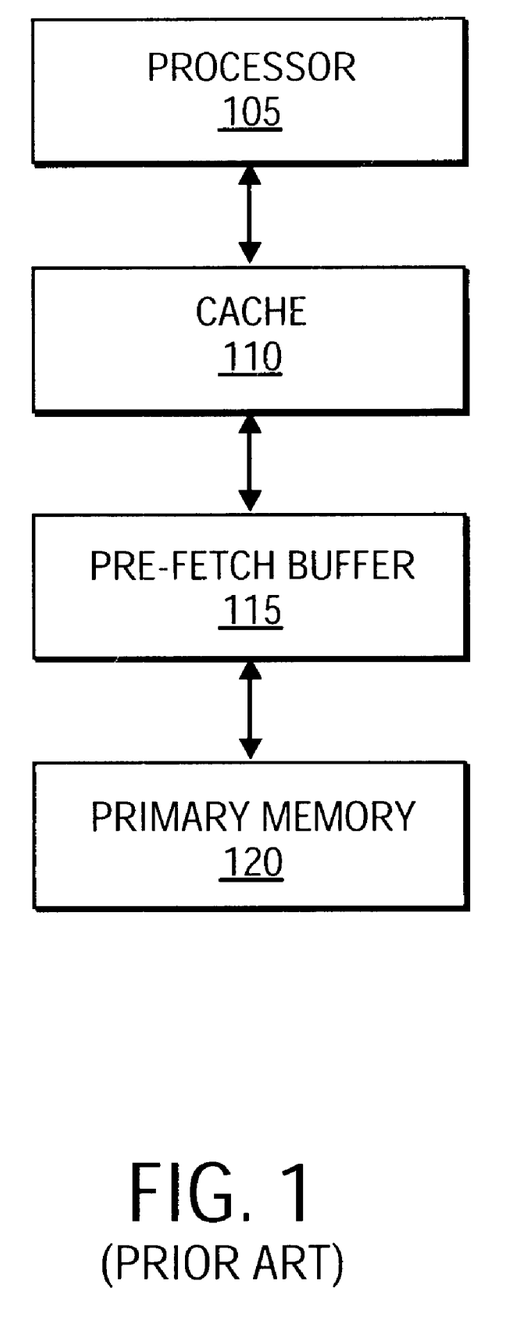
FIG. 1 illustrates a simplified prior art implementation of a traditional one-fit-all single stream hierarchical cache design.

FIG. 1 illustrates a simplified prior art implementation of a traditional one-fit-all single stream hierarchical cache design. Generally, all memory access instructions at the assembly language level are either LOAD or STORE instructions. In a LOAD instruction, data is transferred from the primary memory 120 (e.g., random access memory (RAM) or read-only memory (ROM)) to a pre-fetch buffer 115. The data from the pre-fetch buffer 115 is then transferred to the cache 110 that provides faster access time. When the data to be loaded is already in the cache, the processor 105 fetches it directly from the cache. This bypasses having to access the slow primary memory and the system bus, allowing the bus to be used by other devices.

In one embodiment of the present invention, memory access is partitioned into throughput limited access and latency limited access. Throughput limited access refers to memory access that tend to be sequential or predictable. For example, retrieving data entries stored in an array structure is sequential and predictable. This is because when the address of the first entry is known, the addresses of the subsequent entries can be generated. With throughput limited access, concurrent operations are possible because data can be accessed while subsequent addresses are being generated. As such, subsequent elements of the array can be made available without having to go through the same delay in accessing the first element of the array. This is referred to as streamable access because the instruction is accessing a stream of data instead of a single piece of data. On the other hand, latency limited access tends to be singular, random and unpredictable. With latency limited access, it is difficult to predict the address of the next piece of data. Latency limited access in general tends to be slower because each memory access is unique which makes the next memory access address unpredictable.

The traditional cache design is for single stream access. Using prefetch provides optimization for cache performance. However, when there are multiple distinct stream accesses, they are treated sequentially even though each stream deals with separate data. Otherwise, the multiple streams of memory accesses would be competing for the same cache resource.

In one embodiment, the techniques of the present invention provide a scalable memory subsystem that can accommodate multiple stream accesses, different types of access loads, and maximize the utilization of the available memory bandwidth.

By distinguishing the different type of accesses, cache resources can be partitioned and allocated accordingly. In one embodiment, different cache structures are used to accommodate memory accesses of different types.

In one embodiment, latency limited access operations are processed by using faster and smaller cache having the traditional cache structure. These caches are optimized to minimize latency (e.g., smaller size). With throughput limited access operations, a pool of smaller caches memory having a new cache structure different than the traditional cache structure is used. These caches are referred to herein as cachelets. Each of the cachelets serving throughput-limited access operations is optimized for access throughput using the new cache structure. With throughput-limited accesses, each access time, even if longer, can be overlapped, and an aggressive prefetch schema can be applied to maximize the bandwidth utilization of the core-to-memory channel.

In one embodiment, throughput limited access is performed using a pipelining technique. In pipelining, the processor begins executing a second instruction before the first instruction is completed. This allows several instructions to be in the pipeline simultaneously, with each instruction being at a different processing stage. It would be apparent to one skill in the art that throughput limited access becomes more efficient for longer instruction pipeline.

Figure 2:
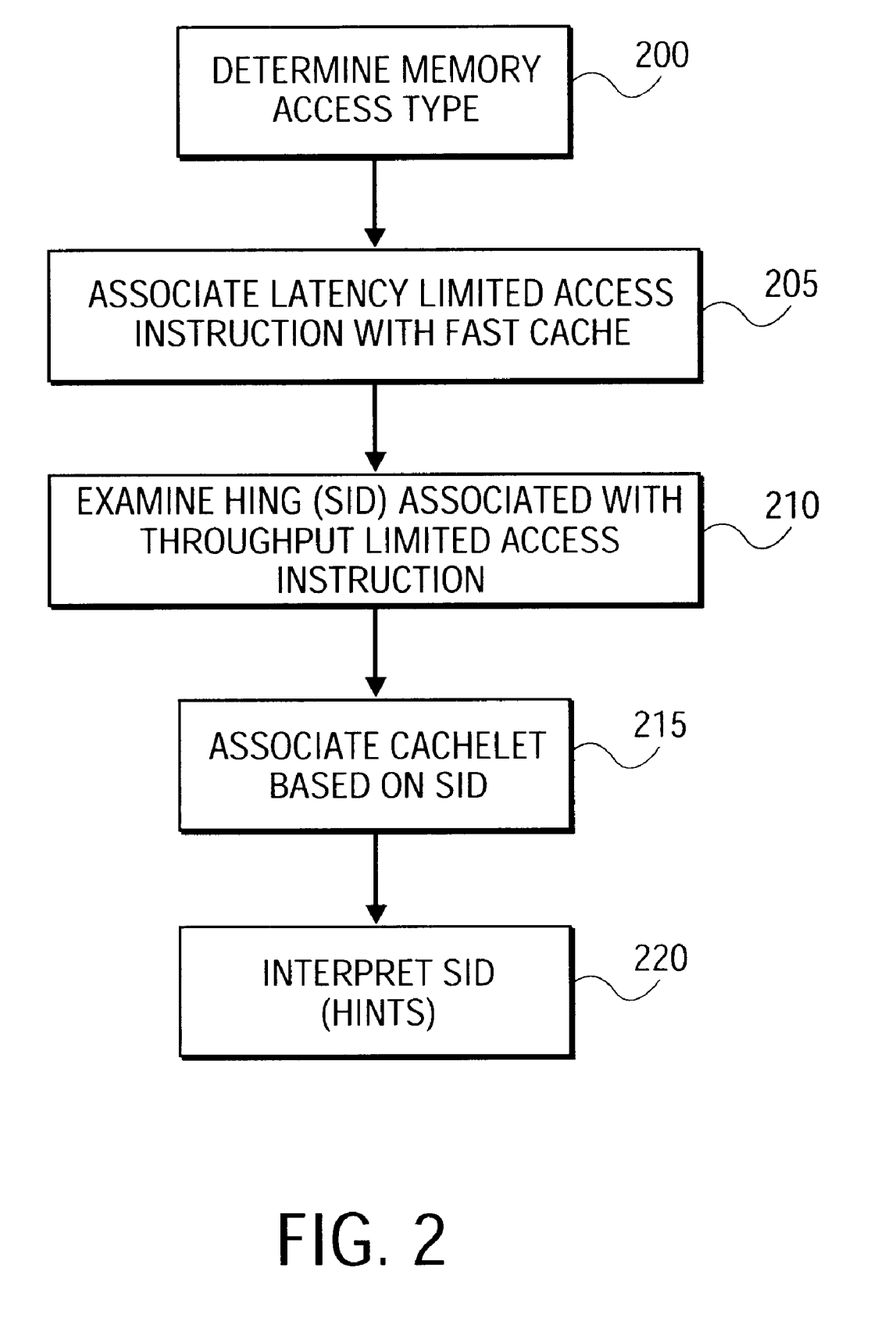
FIG. 2 illustrates an exemplary flow diagram of one embodiment of the present invention.

FIG. 2 illustrates a simplified flow diagram of one embodiment of the present invention. At block 200, each memory access instruction is examined to determine whether the access is a throughput limited access or latency limited access. The instruction may be a simple scalar instruction such as, for example, an integer operation, in which case the memory access is a latency-limited access. The instruction may also be a complex instruction such as, for example, a floating-point operation, in which case the memory access is a throughput-limited access. Based on the type of instruction, the appropriate cache is utilized. If the instruction is latency limited access, a small and fast cache is used, as shown in block 205. As discussed before, this cache has the same structure as the traditional cache.

When the instruction is a throughput limited access type, a hint associated with the instruction is examined for further demarcation, as shown in block 210. The hints are used to identify the different data streams associated with throughput limited access. Each of these data streams is handled separately and differently. For example, the data stream associated with a floating-point operation is handled differently from the data stream associated with elements of an array. The hint is referred to as an access stream identifier, or SID. In one embodiment, the SID is introduced in the form of an operand of the instruction. At block 215, the throughput limited access instruction is associated with one of the cachelet in the pool of cachelets. At block 220, the SID in the instruction is interpreted and the appropriate memory access operation is performed.

This memory hierarchy of multiple cachelets provides performance advantages by allowing parallel access operations for large aggregates of instructions. This access parallelism minimizes access interference between distinct aggregates of instructions. This is because it is unlikely for two distinct access streams to displace each other if each stream is allocated to a distinct cachelet. For example, considering a program that performs pattern matching between a sequence of phrases and an electronic dictionary, the sequence of phrases is organized as a link list while the dictionary is organized as an ordered tree. These are two distinct access streams used to access two distinct data structures. When the accesses to the sequence of phrases are handled by a different cachelet from the accesses to the dictionary, there will be minimal resource contention because the two streams of access are distinct.

Figure 3:
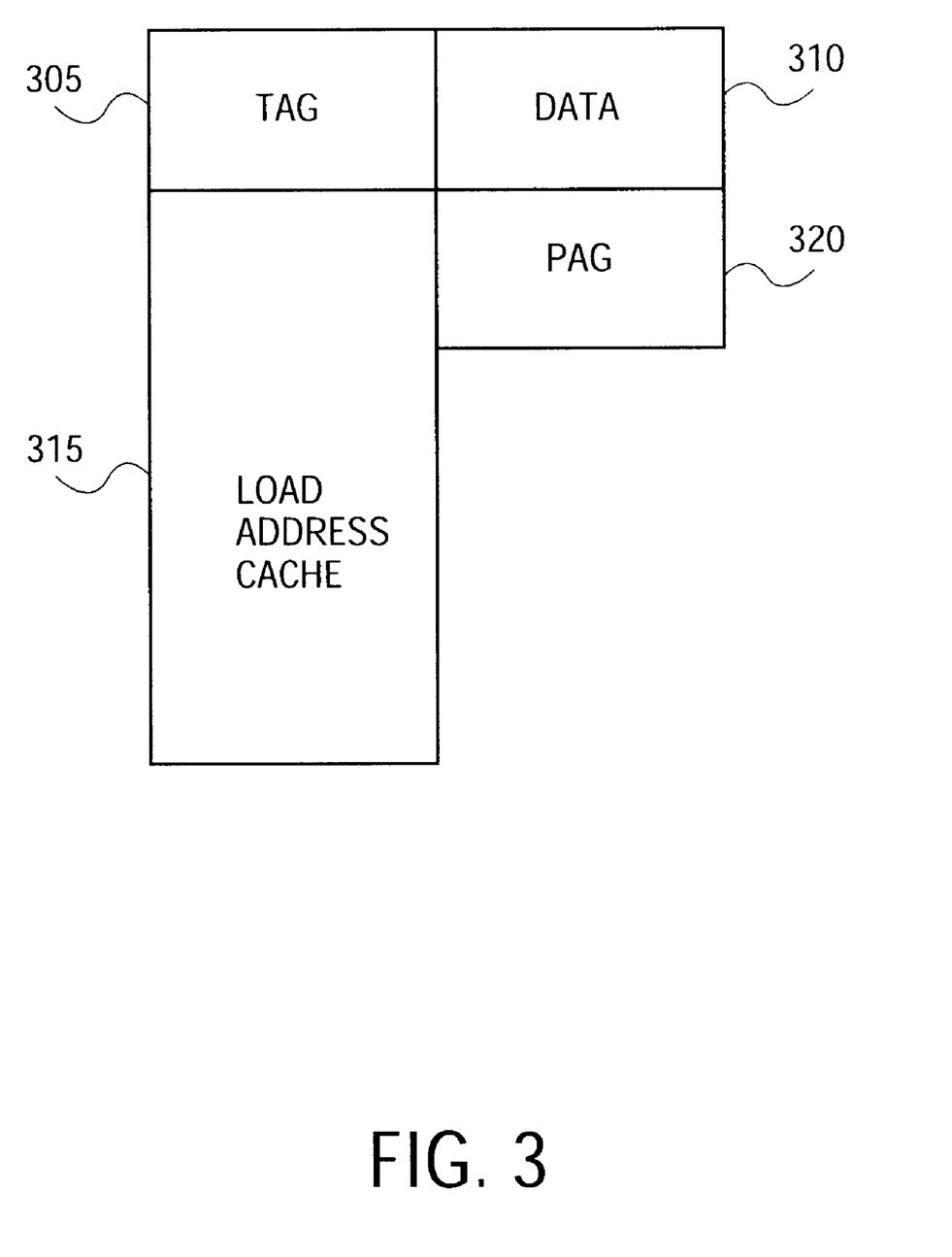
FIG. 3 illustrates a simplified diagram of one embodiment of a cachelet.

FIG. 3 illustrates a simplified diagram of one embodiment of a cachelet used for throughput limited accesses. The cachelet includes several subsystems. A first subsystem is a tag subsystem 305 that holds a number of entries representing the memory addresses and determines whether there is a match for the requested datum. A second subsystem is a memory subsystem 310 that holds and delivers the data. The first and the second subsystem in this embodiment behave like the traditional cache system and together are referred herein as a head data cache (HD).

A third subsystem is a load address cache (LD) subsystem 315 that caches load addresses. There may be multiple entries in the load address cache (LD) subsystem 315 where each entry caches one load address. The load address cache (LD) is a data trace cache containing only load addresses with no load data. The LD is used in pointer chasing access such as, for example, link lists. With the link list, the address of the next location is not necessarily sequential. As such, individual address has to be generated by tracing through the link and stored in the LD. In one embodiment, throughput limited access having data stream following the link list structure can be processed by accessing the first group of data through the head data cache (HD). While the HD is being accessed, the LD traces the link list to generate the subsequent group of addresses such that the corresponding subsequent group of data can be prefetched and made available when the first group of data in the HD is consumed.

A fourth subsystem is a programmable address generator (PAG) 320. The PAG is used to generate addresses in operations where a next address can be predicted such as, for example, accessing elements of an array. The PAG can be programmed to use one of many different formulas for address generation. The access done with this programmable address generation is referred to as a fixed stride access. In one embodiment, the address can be calculated from a known address because consecutive addresses are at a fixed distance from one another. It will be appreciated to know that the latency of the PAG operation can be overlapped in throughput limited access.

For throughput limited access sequences, access to the HD can be overlapped with parallel prefetches using addresses from the LA or the PAG. In one embodiment, access optimization schemas such as, for example, load address prediction table or pre-fetch buffers can be used with each cachelet. For example, when the main instruction pipeline starts to access the head cache (HD), run-ahead memory management logic such as, for example, a daughter pipeline can be activated. This daughter pipeline can concurrently generate address prefetch using the load address cache (LD) or using the programmable address generator (PAG), depending on the type of stream. The type of stream is determined based on the value of the hint information from the SID.

When the main pipeline has consumed all data found from the HD, the runahead logic has already brought the prefetched data from the memory and store the data in the prefetch buffer. The address prediction for accesses within each SID is reliable because the prediction is done independently on a stream-by-stream basis. It would be apparent to one skilled in the art that it may not be necessary to build a set of distinct cachelets, but rather various strategies can be employed such as, for example, having a free pool of cache from which each cachelet is allocated.

Figure 4:
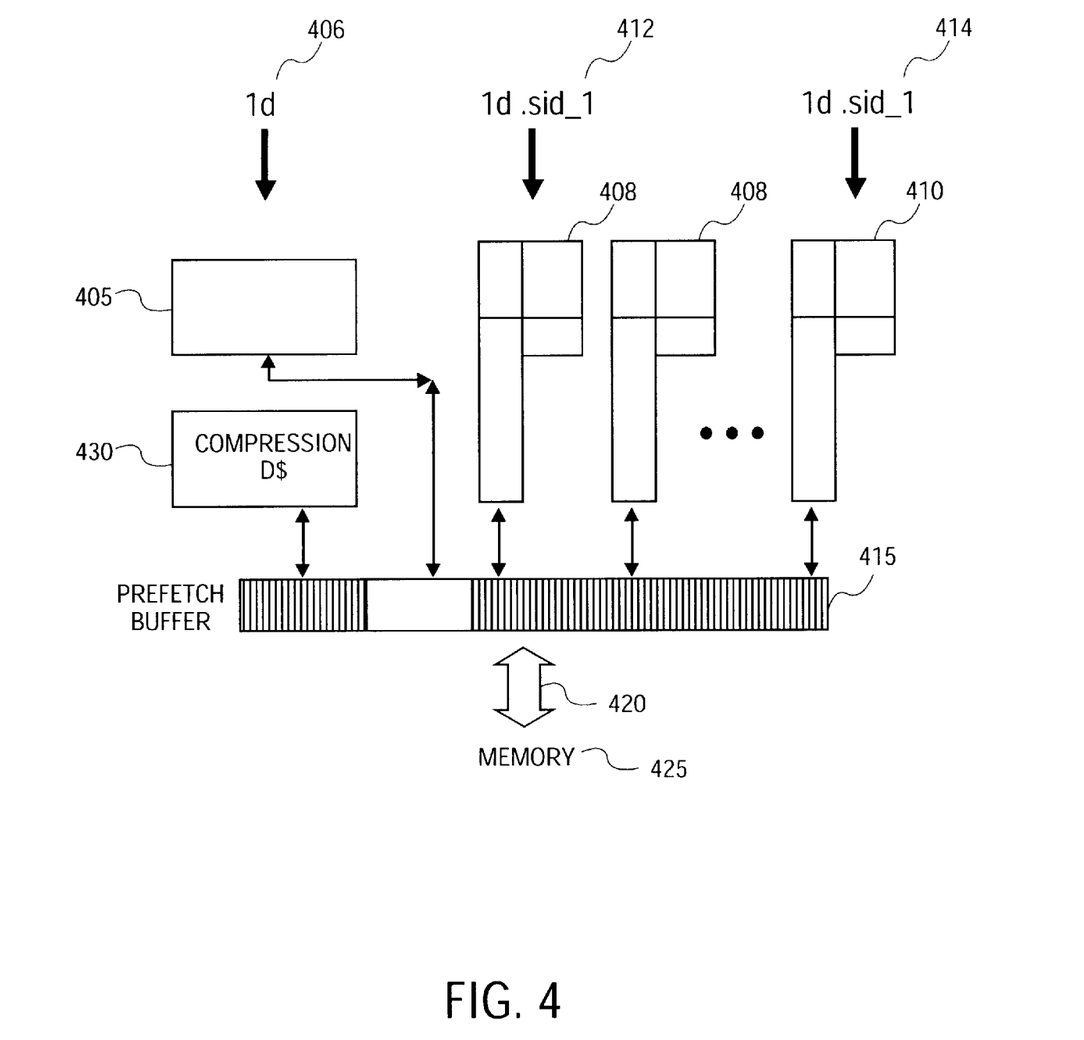
FIG. 4 is an exemplary diagram illustrating one embodiment of the cache system.

FIG. 4 is an exemplary diagram illustrating one embodiment of the ache system. The cache resource is partitioned into multiple cachelets 410. Cache 405 has the same structure as the traditional cache and is responsible for handling the latency limited access instructions such as, for example, instructions that deal with integer operations. Note that the instruction 406 associated with cache 405 does not need to have a stream id (SID) assigned to it. This is because there is no stream identification for latency access instructions.

Cachelets 408, 409, and 410 have the same cache structure as illustrated in FIG. 3, and are responsible for handling throughput limited access instructions such as, for example, floating point operation instructions. Note that the instructions 412 and 414 associated with cachelets 408 and 410 have the same assigned SID (sid_1). Data from the main memory 425 is prefetched into the prefetch buffer 415 through the memory channel 420. In one embodiment, speculative prefetched data can be compressed and stored in a compression cache 430 for faster access. This is because the processing speed used to compress and decompress data is much faster than the speed of the data bus and of the memory.

The stream id (SID) provides information that allows one stream of accesses to be distinguished from another stream of accesses. In one embodiment, each different data structure in a program is associated with a distinct SID. This SID distinction prevents any resource conflict when accessing more than one data structures. For example, the data structure associated with the employee personnel records should not conflict with the data structure associated with the company division records. The SID allows each stream to be mapped to the appropriate distinct cachelet. In one embodiment, the SID is designed such that a unique SID will cause the instruction to be mapped to one of the cachelet having the traditional cache structure. For example, setting the SID of the LOAD or STORE instruction to zero causes the instruction to be mapped to a cachelet that has the same structure as the traditional data cache. The instruction is then handled as though it does not have any hints. The SID that is incorporated into the instruction is also referred to as a virtual SID.

In one embodiment, the SID is encoded as an operand in the instruction. The operand may be encoded as literal or as a value stored in a register reserved specifically for SID value. When the SID is encoded as the operand, the SID value should not affect the execution of the instruction. It would be apparent to one skilled in the art that other method of passing the SID value can be used for the purpose of passing SID as a hint operand. In one embodiment, accesses with similar behavior may be aggregated with the same SID. In one embodiment, the instruction architecture set is enhanced to express new hint instruction or hint for existing instructions. This hint information can be used by the hardware to utilize the hardware structures.

In another embodiment, each of the cachelets in the pool is associated with a distinct identifier. This allows mapping of the virtual SID in the instruction to the appropriate cachelet. The cachelet identifier is referred to as physical SID. The mapping from the virtual SID to the physical SID makes it possible to accommodate the limited number of cachelets in the cache resource pool. In one embodiment, the number of cachelets is fixed and the mapping is performed based on the fixed number of available cachelets. Alternatively, the number of available cachelets can be dynamically generated from a free cache resource. In which case, an allocation table is necessary to keep track of the number of cachelets and the available cache resource.

The multiple numbers of caches designed for latency limited access and throughput limited access generally necessitate multiple corresponding channels to the main memory. In one embodiment, prefetch buffer partitioning and memory channel multiplexing schema is used to maximize the utilization of the bandwidth. The memory access requests from each cachelet are allocated to distinct prefetch buffers with each cachelet having its own dedicated buffer. It would be apparent to one skilled in the art that all the buffers can be allocated from a free list of buffer space.

Figure 5:
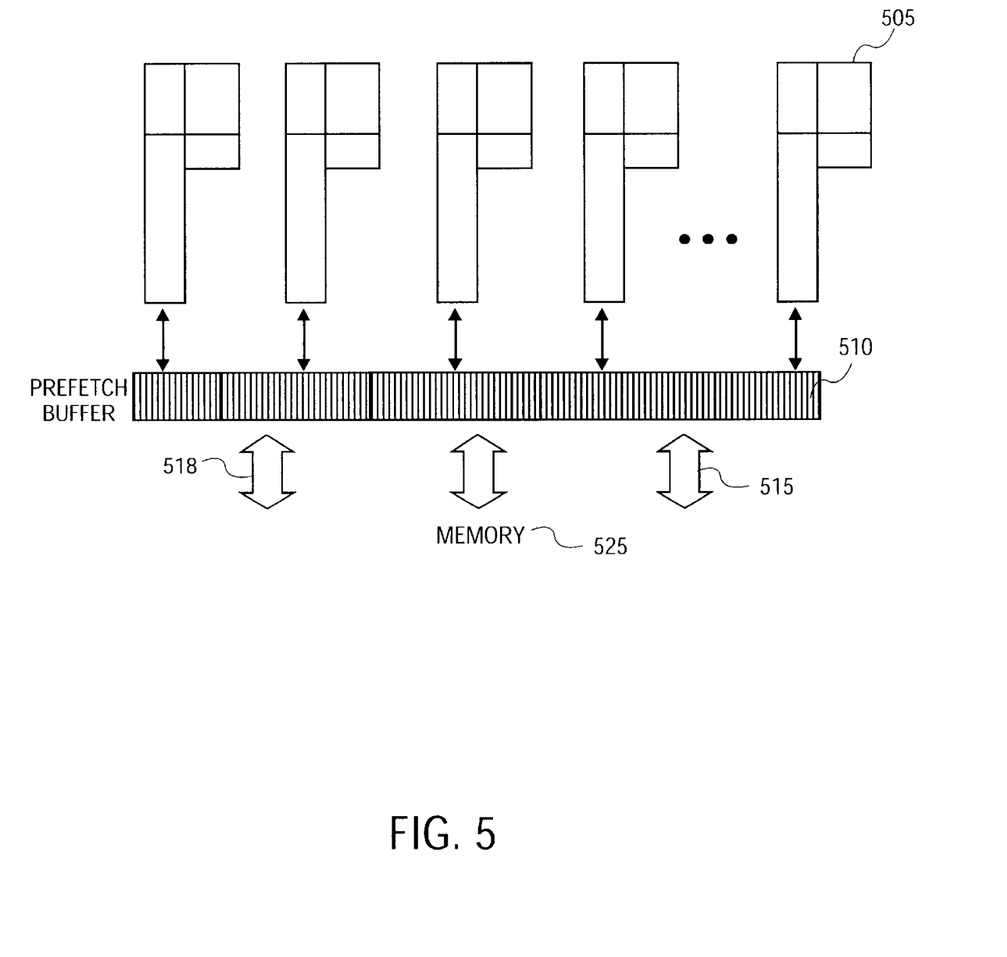
FIG. 5 is an exemplary diagram illustrating one embodiment of the multiplexing of data packets from the multiple cachelets.

FIG. 5 is an exemplary diagram illustrating one embodiment of the multiplexing of data packets to transfer data from the cachelet buffers to the main memory. Memory access requests from each prefetch buffer 510 associated with the cachelet 505 are encoded in packets. Each packet includes a header information section, a data section, and other relevant information such as, for example, routing hints. The header information section may contain the requested address. The packets from different cachelet buffers may be multiplexed together and sent out on the same channel 515 to the main memory 525. The channel 515 is referred to as the wormhole channel.

In one embodiment, a channel 518 may be dedicated to a cachelet buffer and handles only packets from that cachelet buffer. The requested data is returned using the same packet format with the data placed in the data section of the packet. Various compression schemas can be applied to reduce the packet size. For example, in the return data packet, prefetch buffer index can be used in place of full address, since the mapping between buffer index and request address has already been established. The wormhole channel control logic is responsible for multiplexing packets from the different cachelet buffers. In one embodiment, the SID may be used to determine whether the packets from the corresponding cachelet buffer can be multiplexed with the packets from other cachelet buffers though the same wormhole channel.

Figure 6:
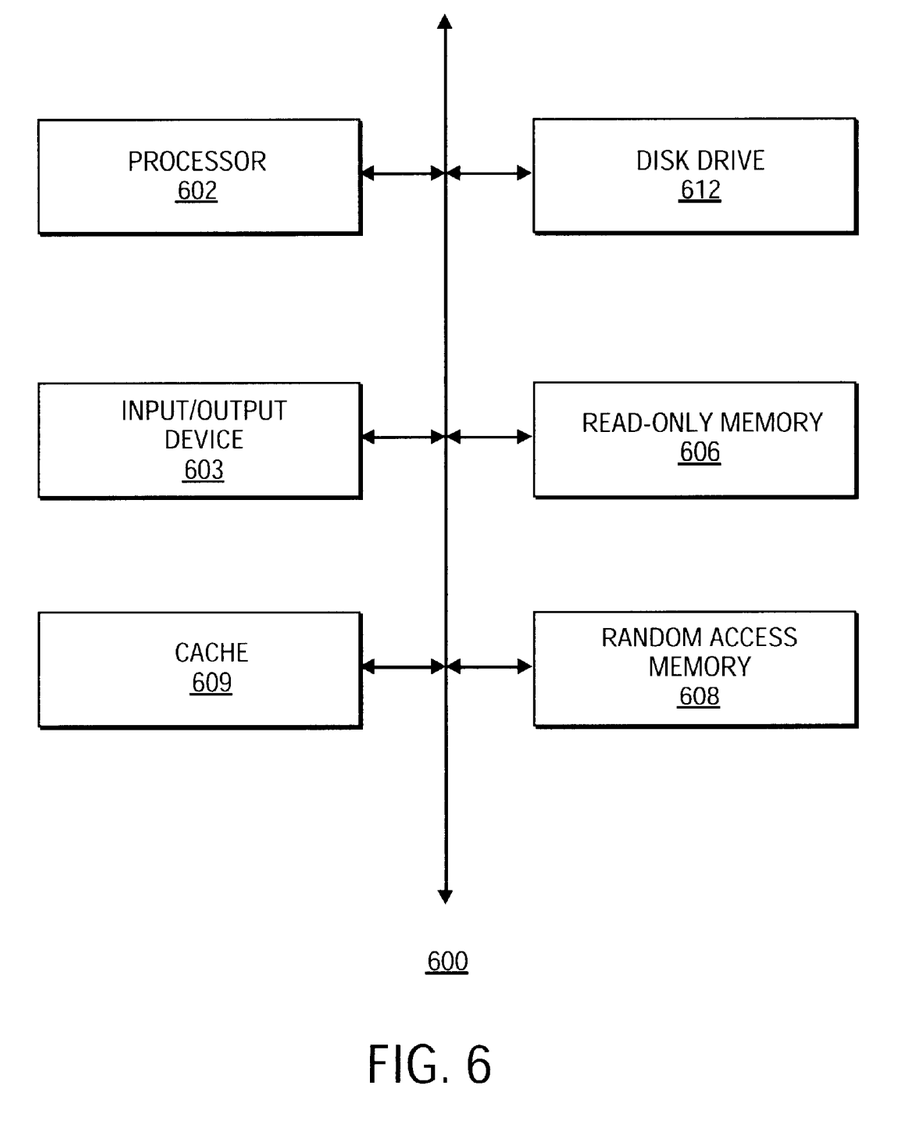
FIG. 6 illustrates an embodiment of a computer system.

FIG. 6 illustrates an embodiment of a computer system that can be used with the present invention. The various components shown in FIG. 6 are provided by way of example. Certain components of the computer in FIG. 6 can be deleted from the addressing system for a particular implementation of the invention. The computer shown in FIG. 6 may be any type of computer including a general-purpose computer.

FIG. 6 illustrates a system bus 600 to which various components are coupled. A processor 602 performs the processing tasks required by the computer. Processor 602 may be any type of processing device capable of executing instructions accessing memory in the similar manners discussed above. An input/output (I/O) device 603 is coupled to bus 600 and provides a mechanism for communicating with other devices coupled to the computer. For example, the user can use the I/O device 603 to specify the name and email address of the recipient to whom the multimedia document is to be sent.

A read-only memory (ROM) 606 and a random access memory (RAM) 608 are coupled to bus 600 and provide a storage mechanism for various data and information used by the computer, such as, for example, the interface code that allow the user to interact with the computer. Although ROM 606 and RAM 608 are shown coupled to bus 600, in alternate embodiments, ROM 606 and RAM 608 are coupled directly to processor 602 or coupled to a dedicated memory bus (not shown).

A cache system 609 couples with the ROM 606 and RAM 608. The cache system is partitioned into pools of cachelets to handle throughput-limited access using the cache structure discussed above. Additionally, the cache system also comprises smaller caches having the traditional cache structure to handled latency limited access as discussed above. Although, this embodiment describes the cache system outside of the processor, it should also apply to the cache system implemented on the processor.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method comprising:

accessing data from a first cache comprising a first set of addresses and corresponding data at each of the addresses in the first set, the data accessed responsive to a memory access instruction, the memory access instruction including a hint for generating a second set of addresses;

when the hint indicates a fixed stride, generating a plurality of addresses for a second set of addresses, the second set of addresses following the first set of addresses, the second set of addresses generated based on the fixed stride; and when the hint indicates a link, generating a plurality of addresses for a third set of addresses, the third set of addresses following the first set of addresses, each address in the third set of addresses generated by tracing the link.

2. The method of claim 1, wherein the addresses in the second set of addresses and the addresses in the third set of addresses are predictable.

3. The method of claim 1, wherein the third set of addresses is stored in a second cache.

4. The method of claim 1, wherein the addresses in the second set of addresses are generated while the data is being accessed from the first cache.

5. A cache system, comprising:

a tag subsystem comprising of a first set of plurality of addresses;

a memory subsystem coupled to the tag subsystem, the memory subsystem comprising of a plurality of data corresponding to the plurality of addresses in the tag subsystem, each address being the address of a location in main memory;

a programmable address generator subsystem coupled to the tag subsystem and the memory subsystem, the programmable address generator subsystem computing a plurality of addresses for a first set addresses based on an addressing formula, wherein the first set of addresses is associated with a first stream of data; and a load address subsystem coupled to the tag subsystem and the memory subsystem, the load address subsystem generating a plurality of addresses for a second set of addresses, each address in the second set of addresses generated by tracing through a link associated with another address in the second set of addresses, wherein the second set of addresses is associated with a second stream of data, and wherein the first stream of data is different from the second stream of data.

6. The system of claim 5, wherein the addressing formula is based on a fixed stride between consecutive data.

7. The system of claim 5, wherein the programmable address generator subsystem and the load address subsystem generate addresses to prefetch data for the memory subsystem.

8. The system of claim 5, wherein the addresses generated for the first stream of data and the second stream of data are predictable.

9. A computer system, comprising:
a processor having an instruction set comprising a plurality of memory access instructions to perform data stream accesses;
a main memory coupled with the processor;
a cache coupled with the main memory, the cache comprising:
a first cache to provide data associated with non-data stream memory accesses;
a second cache to provide the data associated with the data stream memory accesses, the second cache comprising:
a head cache comprising a first set of address and a first data stream;
a programmable address generator coupled to the head cache, the programmable address generator computing a plurality of addresses for a second set of addresses based on a fixed stride addressing formula, wherein the second set of addresses associated with a second data stream; and
a load address cache coupled to the head cache, the load address cache generating a plurality of addresses for a third set of addresses, each address in the third set of addresses generated by tracing through a link list associated with another address in the third set of addresses, wherein the third set of addresses associated with a third data stream.

10. The computer system of claim 9, wherein the cache comprises a plurality of the second caches, and wherein each of the second caches is assigned a distinct physical stream identifier.

11. The computer system of claim 9, wherein:
the second set of addresses follows the first set of addresses,
the second data stream and the first data stream is associated with a first data stream memory access instruction,
the third set of addresses follows the first set of addresses, and
the third data stream and the first data stream is associated with a second data stream memory access instruction.

12. The computer system of claim 11, wherein the first data stream memory access instruction has a different hint from the second data stream memory access instruction.

13. The computer system of claim 12, wherein the hint is associated with the instruction to indicate a type of data stream memory access, wherein each hint enumerates a different data stream memory access.

14. The computer system of claim 13, wherein each data stream memory access is assigned a different virtual stream identifier corresponding to the hint, and wherein each virtual stream identifier is mapped to a physical stream identifier associated with the second cache.

15. The computer system of claim 14, wherein one or more virtual stream identifiers is mapped to one physical stream identifier.

16. The computer system of claim 13, wherein the type of data stream memory access comprises a fixed stride access and a link trace access.

17. The computer of claim 16, wherein the address associated with the link trace access is generated by following a link associated with another address.

18. An apparatus comprising:
a first cache to provide data associated with non-data stream memory accesses;
a second cache to provide data associated with data stream memory accesses, the second cache comprising:
a head cache comprising a first set of address and a first data stream;
a programmable address generator coupled to the head cache, the programmable address generator computing a plurality of addresses for a second set of addresses based on a fixed stride addressing formula, wherein the second set of addresses are associated with a second data stream; and
a load address cache coupled to the head cache, the load address cache generating a plurality of addresses for a third set of addresses, each address in the third set of addresses generated by tracing through a link list associated with another address in the third set of addresses, wherein the third set of addresses are associated with a third data stream.

19. The apparatus of claim 18, wherein:
the second set of addresses follows the first set of addresses,
the second data stream and the first data stream form a first data stream memory access,
the third set of addresses follows the first set of addresses, and
the third data stream and the first data stream form a second data stream memory access.

20. The apparatus of claim 18, wherein a hint is used to indicate a type of data stream memory access, wherein each hint enumerates a different data stream memory access.

21. The apparatus of claim 18, wherein:
the second cache corresponds to a distinct physical stream identifier,
each data stream memory access corresponds to a distinct virtual stream identifier, and the virtual stream identifier is mapped to the physical stream identifier such that the second cache can provide data to one or more data stream memory accesses each having a different virtual stream identifier.

22. A method, comprising:
associating a different virtual stream identifier to each of a plurality of memory access instructions; and
when the memory access instruction is for stream memory access, mapping the corresponding virtual stream identifier to a cachelet from a pool of cachelets, the cachelet identified to provide caching for data associated with the stream memory access, wherein the cachelet includes a programmable address generator and an address cache.

23. The method of claim 22, wherein each of the cachelet in the pool of cachelets is assigned a unique physical stream identifier.

24. The method of claim 23, wherein maping the virtual stream identifier to a cachelet comprises mapping the virtual stream identifier to the physical stream identifier assigned to the cachelet.

25. The method of claim 24, wherein more than one virtual stream identifier can be mapped to one physical stream identifier.

* * * * *